United States Patent [19]
Winston

[11] Patent Number: 5,289,356
[45] Date of Patent: Feb. 22, 1994

[54] NONIMAGING OPTICAL ILLUMINATION SYSTEM

[75] Inventor: Roland Winston, Chicago, Ill.

[73] Assignee: NiOptics Corporation, Evanston, Ill.

[21] Appl. No.: 732,982

[22] Filed: Jul. 19, 1991

[51] Int. Cl.$^5$ .............................................. F21V 7/04
[52] U.S. Cl. ................... 362/217; 362/341; 362/347; 359/867; 250/504 R
[58] Field of Search ............... 362/217, 296, 341, 347, 362/350; 359/867, 868, 869; 250/493.1, 503.1, 504 R

[56] References Cited

U.S. PATENT DOCUMENTS

| | | |
|---|---|---|
| 3,760,237 | 9/1973 | Jaffe . |
| 3,923,381 | 12/1975 | Winston . |
| 3,949,318 | 4/1976 | Zeidler . |
| 4,002,499 | 1/1977 | Winston . |
| 4,003,638 | 1/1977 | Winston . |
| 4,045,246 | 8/1977 | Mlavsky et al. . |
| 4,114,592 | 9/1978 | Winston . |
| 4,130,107 | 12/1978 | Rabi et al. . |
| 4,230,095 | 10/1980 | Winston . |
| 4,237,332 | 12/1980 | Winston . |
| 4,240,692 | 12/1980 | Winston . |
| 4,327,969 | 5/1982 | Giutronich et al. . |
| 4,483,007 | 11/1984 | Winston . |
| 4,697,867 | 10/1987 | Blanc et al. . |
| 4,875,750 | 10/1989 | Spaeth et al. . |
| 4,883,333 | 11/1989 | Yanez . |
| 4,898,450 | 2/1990 | Jannson . |
| 4,912,614 | 3/1990 | Goldenberg ............... 359/867 |
| 4,922,107 | 5/1990 | Rabl et al. ............... 359/869 |
| 4,947,305 | 8/1990 | Gunter, Jr. . |
| 4,956,759 | 9/1990 | Goldenberg et al. . |
| 4,962,311 | 10/1990 | Poisel et al. . |
| 4,964,025 | 10/1990 | Smith . |
| 4,990,788 | 2/1991 | Rabl et al. ............... 359/869 |

FOREIGN PATENT DOCUMENTS

| | | | |
|---|---|---|---|
| 0100102 | 6/1985 | Japan ............... | 362/341 |
| 59-176818 | 3/1986 | Japan . | |

*Primary Examiner*—Ira S. Lazarus
*Assistant Examiner*—Y. Quach
*Attorney, Agent, or Firm*—Reinhart, Boerner, Van Deuren, Norris & Reiselbach

[57] ABSTRACT

A nonimaging illumination or concentration optical device. An optical device is provided having a light source, a light reflecting surface with an opening and positioned partially around the light source which is opposite the opening of the light reflecting surface. The light reflecting surface is disposed to produce a substantially uniform intensity output with the reflecting surface defined in terms of a radius vector $R_i$ in conjunction with an angle $\phi_i$ between $R_i$, a direction from the source and an angle $\theta_i$ between direct forward illumination and the light ray reflected once from the reflecting surface. $R_i$ varies as the exponential of tan $(\phi_i - \theta_i)/2$ integrated over $\phi_i$.

25 Claims, 4 Drawing Sheets

NONIMAGING OPTICAL ILLUMINATION SYSTEM

The present invention is directed generally to a method and apparatus for providing user selected nonimaging optical outputs from electromagnetic energy sources of finite but small extent. More particularly, the invention is directed to a method and apparatus wherein the design profile of an optical apparatus for small, finite optical sources can be a variable of the acceptance angle of reflection of the source ray from the optical surface. By permitting such a functional dependence, the nonimaging output can be well controlled.

Methods and apparatus concerning illumination by light sources of finite extent are set forth in a number of U.S. Pat. Nos. including 3,957,031; 4,240,692; 4,359,265; 4,387,961; 4,483,007; 4,114,592; 4,130,107; 4,237,332; 4,230,095; 3,923,381; 4,002,499; 4,045,246; 4,912,614 and 4,003,638 all of which are incorporated by reference herein. In one of these patents the nonimaging illumination performance was enhanced by requiring the optical design to have the reflector constrained to begin on the emitting surface of the optical source. However, in practice such a design was impractical to implement due to the very high temperatures developed by optical sources, such as infrared lamps, and because of the thick protective layers or glass envelopes required on the optical source. In other designs it is required that the optical source be separated substantial distances from the reflector. In addition, when the optical source is small compared to other parameters of the problem, the prior art methods which use the approach designed for finite size sources provide a nonimaging output which is not well controlled; and this results in less than ideal illumination. Substantial difficulties therefore arise when the optical design involves situations such as: (1) the source size is much less than the closest distance of approach to any reflective or refractive component or (2) the angle subtended by the source at any reflective or refractive component is much smaller than the angular divergence of an optical beam.

It is therefore an object of the invention to provide an improved method and apparatus for producing a user selected nonimaging optical output.

It is another object of the invention to provide a novel method and apparatus for providing user selected nonimaging optical output of electromagnetic energy from optical designs using small, but finite, electromagnetic energy sources.

It is a further object of the invention to provide an improved optical apparatus and method of design wherein the optical acceptance angle for an electromagnetic ray is a function of the profile parameters of both two and three dimensional optical devices.

It is a further object of the invention to provide an improved optical apparatus and method of design for radiation collection. It is yet another object of the invention to provide a novel optical device and method for producing a user selected intensity output over an angular range of interest.

It is still an additional object of the invention to provide an improved method and apparatus for providing a nonimaging optical illumination system which generates a substantially uniform optical output over a wide range of output angles.

Other objects, features and advantages of the present invention will be apparent from the following description of the preferred embodiments thereof, taken in conjunction with the accompanying drawings described below wherein like elements have like numerals throughout the several views.

DETAILED DESCRIPTION OF PREFERRED EMBODIMENTS

Figure 1:
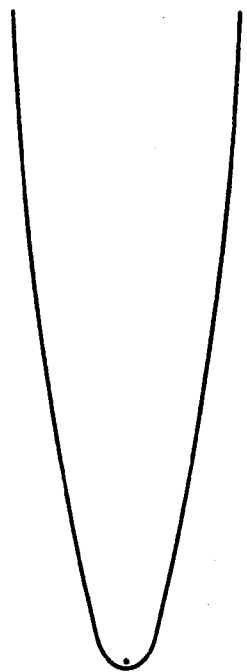
FIG. 1 shows a two-dimensional optical device for providing nonimaging output.

In the design of optical systems for providing nonimaging illumination using optical sources which are small relative to other system parameters, one should consider the limiting case where the source has no extent. This is in a sense the opposite of the usual nonimaging problem where the finite size and specific shape of the source is critical in determining the design. In any practical situation, a source of finite, but small, extent can better be accommodated by the small-source nonimaging design described herein rather than by the existing prior art finite-source designs.

We can idealize a source by a line or point with negligible diameter and seek a one-reflection solution in analogy with the conventional "edge-ray methods" of nonimaging optics (see, for example, W. T. Welford and R. Winston "High Collection Nonimaging Optics," Academic Press. New York, N.Y. (1989)). Polar coordinates R,Φ are used with the source as origin and $\theta$ for the angle of the reflected ray as shown in FIG. 3. The geometry in FIG. 3 shows that the following relation between source angle and reflected angle applies:

$$d/d\Phi(\log R) = \tan\alpha, \quad (1)$$

where $\alpha$ is the angle of incidence with respect to the normal. Therefore, $$\alpha = (\Phi - \theta)/2 \quad (2)$$

Equation (1) is readily integrated to yield, $$\log(R) = \int \tan\alpha \, d\Phi + \text{const.} \quad (3)$$

so that, $$R = \text{const.} \exp(\int \tan\alpha \, d\Phi) \quad (4)$$

This equation (4) determines the reflector profile R(Φ) for any desired functional dependence $\theta(\Phi)$.

Suppose we wish to radiate power (P) with a particular angular distribution P($\theta$) from a line source which we assume to be axially symmetric. For example, $P(\theta)$=const. from $\theta = 0$ to $\theta_1$ and $P(\theta) \sim 0$ outside this angular range. By conservation of energy $P(\theta)d\theta = P(\Phi)d\Phi$ (neglecting material reflection loss) we need only ensure that $$do/do = P(\Phi)/P(\theta) \tag{5}$$

to obtain the desire radiated beam profile. To illustrate the method, consider the above example of a constant $P(\theta)$ for a line source. By rotational symmetry of the line source, $P/do = a$ constant so that, according to Equation (4) we want $\theta$ to be a linear function of $\Phi$ such as, $\theta = a\Phi$. Then the solution of Equation (3) is $$R = R_0/\cos^k(\Phi/k) \tag{6}$$

where, $$k = 2/(1-a), \tag{7}$$

and $R_0$ is the value of $R$ at $\phi = 0$. We note that the case $a = 0 (k = 2)$ gives the parabola in polar form, $$R = R_0/\cos^2(\Phi/2), \tag{8}$$

while the case $\theta$ = constant = $\theta_1$ gives the off-axis parabola,
$$R = R_0 \cos^2(\theta_1/2)/\cos^2[(\Phi-\theta_0)/2] \tag{9}$$

Suppose we desire instead to illuminate a plane with a particular intensity distribution. Then we correlate position on the plane with angle $\theta$ and proceed as above.

Turning next to a spherically symmetric point source, we consider the case of a constant $P(\Omega)$ where $\Omega$ is the radiated solid angle. Now we have by energy conservation, $$P(\Omega)d\Omega = P(\Omega_0)d\Omega_0 \tag{10}$$

where $\Omega_0$ is the solid angle radiated by the source. By spherical symmetry of the point source, $P(\Omega_0)$ = constant. Moreover, we have $d\Omega = (2\pi) d\cos\theta$ and $d\Omega_0 = (2\pi) d\cos\Phi$; therefore, we need to make $\cos\theta$ a linear function of $\cos\Phi$, $$\cos\theta = a \cos\Phi + b \tag{11}_1$$

With the boundary conditions that $\theta = 0$ at $\Phi = 0$, at $\Phi = \theta$, $\theta = \theta_1$ at $\Phi = \Phi_0$, we obtain, $$a = (1 - \cos\theta_1)/(1 - \cos\Phi_0) \tag{12}$$

$$b = (\cos\theta_1 - \cos\Phi_0)/(1 - \cos\Phi_0) \tag{13}$$

[For example, for $\theta_1 << 1$ and $\Phi_0 \sim \pi 2/2$ we have, $\theta \sim \sqrt{2\theta_0}\sin(\frac{1}{2}\Phi)$.]
This functional dependence is applied to Equation (4) which is then integrated, such as by conventional numerical methods.

A useful way to describe the reflector profile $R(\Phi)$ is in terms of the envelope (or caustic) of the reflected rays $r(\Phi)$. This is most simply given in terms of the direction of the reflected ray $t = (-\sin\theta, \cos\theta)$. Since $r(\Phi)$ lies along a reflected ray, it has the form, $$r = R + Lt. \tag{14}$$

where $R = R(\sin\Phi_1 - \cos\Phi)$. Moreover, $$Rd\Phi = Ld\theta \tag{15}$$

which is a consequence of the law of reflection. Therefore, $$r = R + t/(d\theta/d\Phi) \tag{16}$$

In the previously cited case where $\theta$ is the linear function $a\Phi$, the caustic curve is particularly simple, $$r = R + t/a \tag{17}$$

In terms of the caustic, we may view the reflector profile $R$ as the locus of a taut string; the string unwraps from the caustic $r$ while one end is fixed at the origin.

Figure 2:
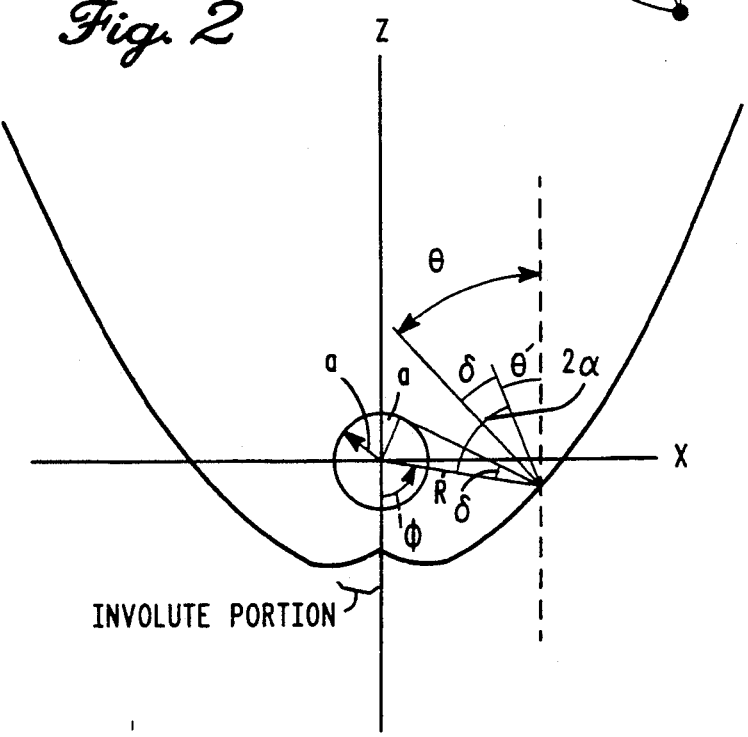
FIG. 2 illustrates a portion of the optical device of FIG. 1 associated with the optical source and immediate reflecting surface of the device.

In any practical design the small but finite size of the source will smear by a small amount the "point-like" or "line-like" angular distributions derived above. To prevent radiation from returning to the source, one may wish to "begin" the solution in the vicinity of $\theta = 0$ with an involute to a virtual source. Thus, the reflector design should be involute to the "ice cream cone" virtual source. It is well known in the art how to execute this result (see, for example, R. Winston, "Appl. Optics," Vol. 17, p. 166 (1978)). Also, see U.S. Pat. No. 4,230,095 which is incorporated by reference herein. Similarly, the finite size of the source may be better accommodated by considering rays from the source to originate not from the center but from the periphery in the manner of the "edge rays" of nonimaging designs. This method can be implemented and a profile calculated using the computer program of the Appendix (and see FIG. 2) and an example of a line source and profile is illustrated in FIG. 1. Also, in case the beam pattern and/or source is not rotationally symmetric, one can use crossed two-dimensional reflectors in analogy with conventional crossed parabolic shaped reflecting surfaces. In any case, the present methods are most useful when the sources are small compared to the other parameters of the problem.

Various practical optical sources can include a long arc source which can be approximated by an axially symmetric line source. We then can utilize the reflector profile $R(\Phi)$ determined hereinbefore as explained in expressions (5) to (9) and the accompanying text. This analysis applies equally to two and three dimensional reflecting surface profiles of the optical device.

Another practical optical source is a short arc source which can be approximated by a spherically symmetric point source. The details of determining the optical profile are shown in Equations (10) through (13).

Figure 4A:
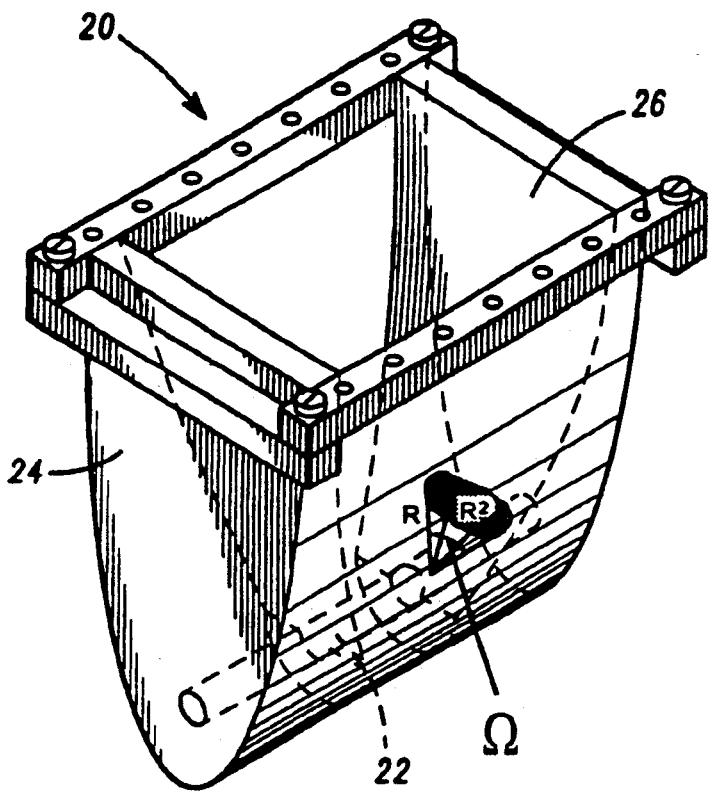
FIG. 4A shows a perspective view of a three-dimensional optical system for nonimaging illumination and FIG. 4BA, 4BB and 4BC illustrate portions and views of the optical system of FIG. 4A.
Figure 4B:
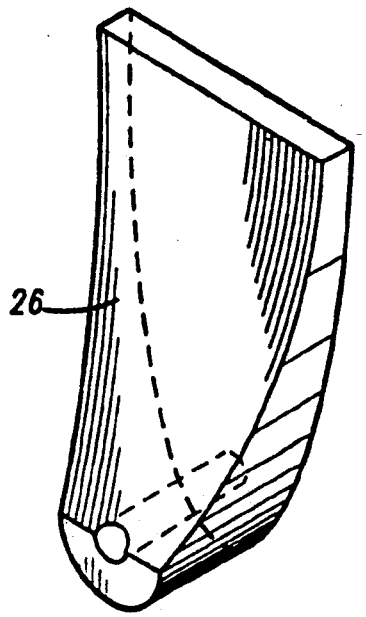
Figure 4B:
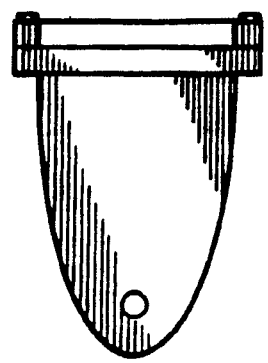
Figure 4B:
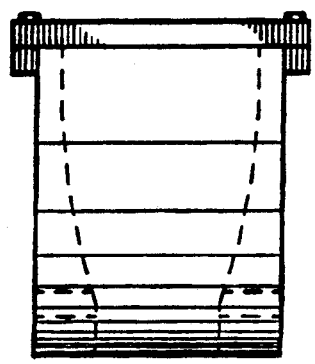
Figure 5A:
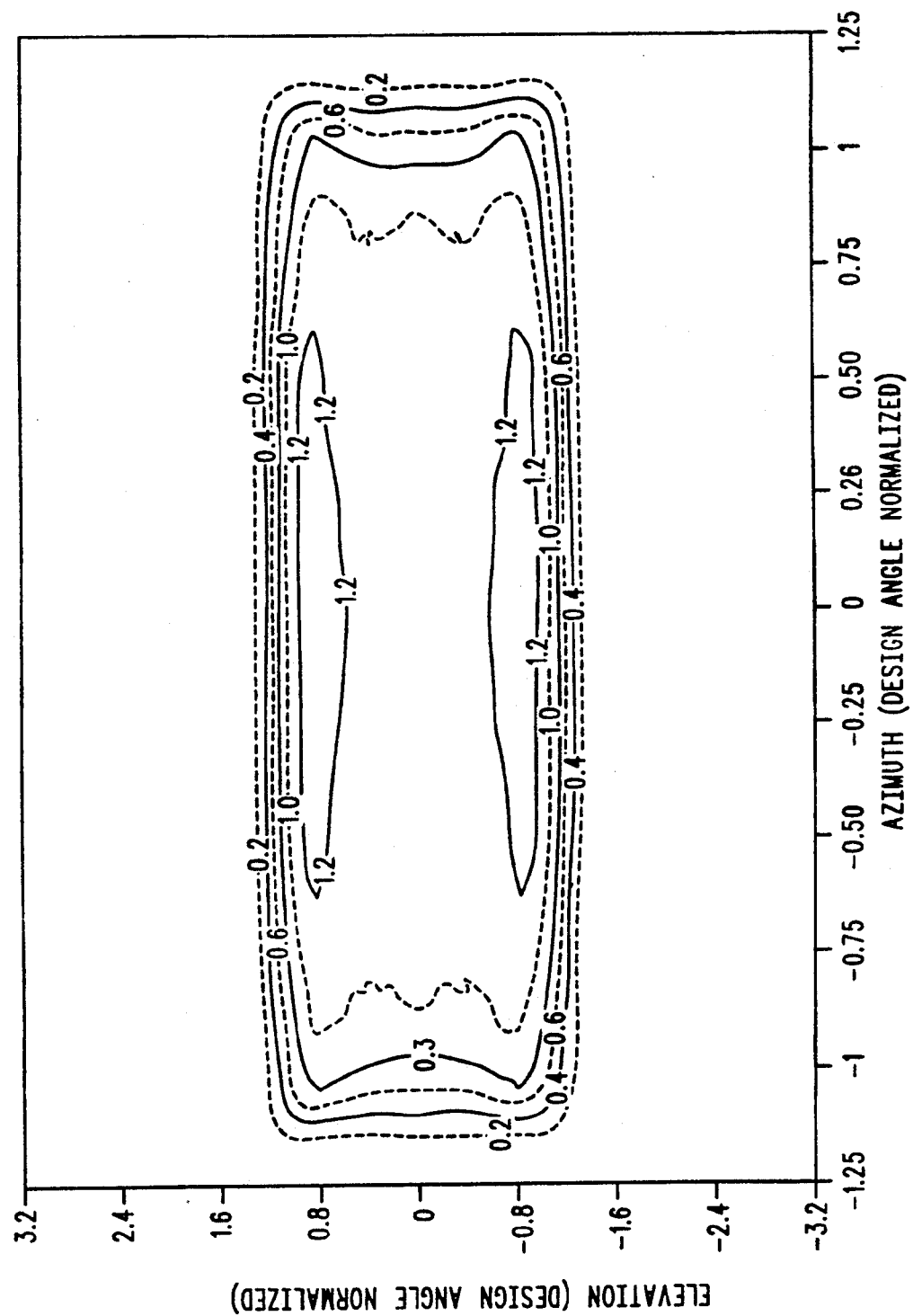
FIG. 5A shows such intensity contours for an embodiment of the invention and FIG. 5B illustrates nonimaging intensity output contours from a prior art optical design.
Figure 5B:
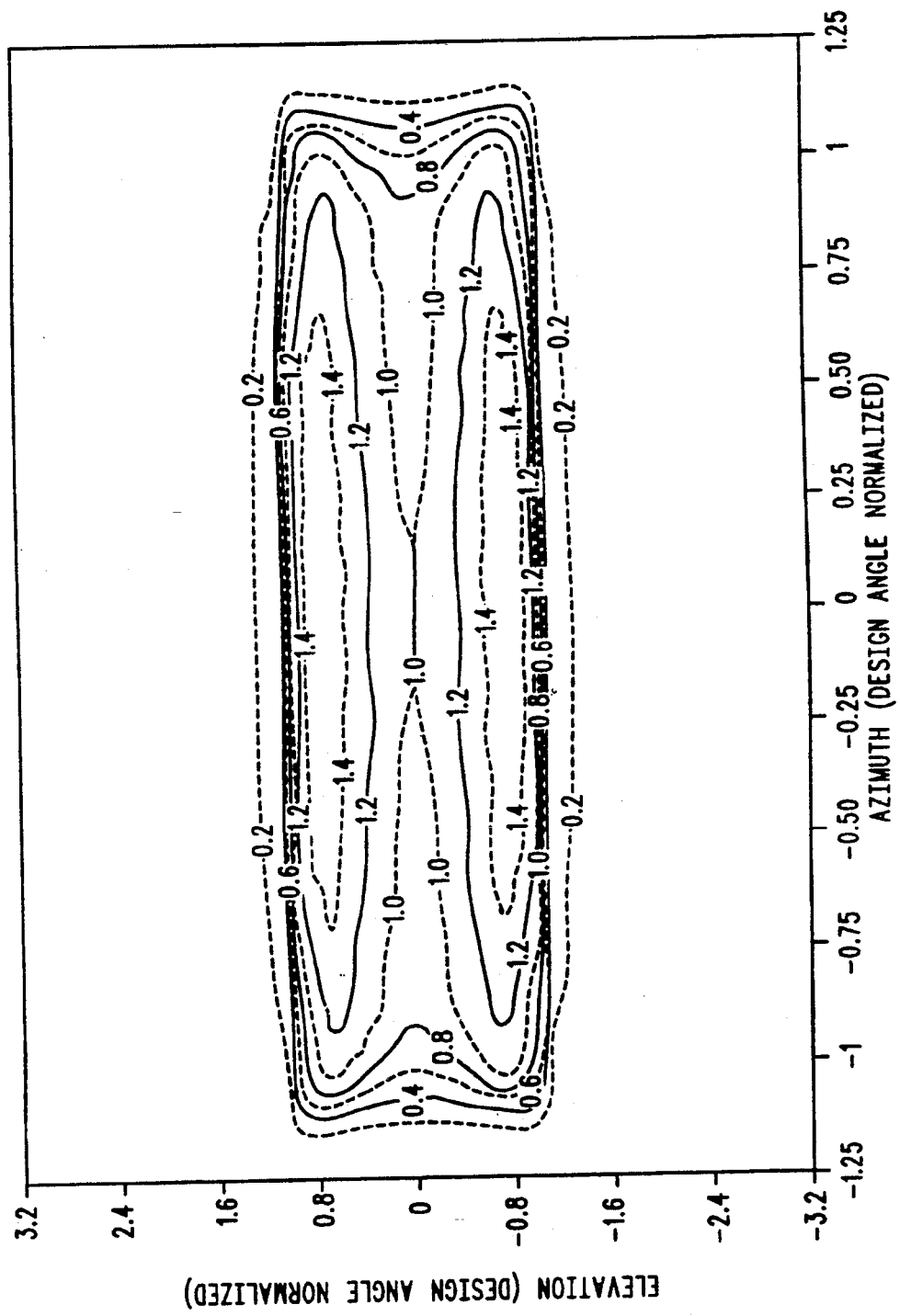

A preferred form of nonimaging optical system 20 is shown in FIG. 4A with a representative nonimaging output illustrated in FIG. 5A. Such an output can typically be obtained using conventional infrared optical sources 22 (see FIG. 4A), for example high intensity arc lamps or graphite glow bars. Reflecting side walls 24 and 26 collect the infrared radiation emitted from the optical source 22 and reflect the radiation into the optical far field from the reflecting side walls 24 and 26. An ideal infrared generator concentrates the radiation from the optical source 22 within a particular angular range (typically a cone of about ±15 degrees) or in an asymmetric field of ±20 degrees in the horizontal plane by ±6 degrees in the vertical plane. As shown from the contours of FIG. 5B, the prior art paraboloidal reflector systems (not shown) provide a nonuniform intensity output, whereas the optical system 20 provides a substantially uniform intensity output as shown in FIG. 5A. Note the excellent improvement in intensity profile from the prior art compound parabolic concentrator (CPC) design. The improvements are summarized in tabular form in Table I below:

TABLE I
Comparison of CPC With Improved Design

|  | CPC | New Design |
|---|---|---|
| Ratio of Peak to On Axis Radiant Intensity | 1.58 | 1.09 |
| Ratio of Azimuth Edge to On Axis | 0.70 | 0.68 |
| Ratio of Elevation Edge to On Axis | 0.63 | 0.87 |
| Ratio of Corner to On Axis | 0.33 | 0.52 |
| Percent of Radiation Inside Useful Angles | 0.80 | 0.78 |
| Normalized Mouth Area | 1.00 | 1.02 |

In a preferred embodiment designing an actual optical profile involves specification of four parameters. For example, in the case of a concentrator design, these parameters are:
1. a = the radius of a circular absorber;
2. b = the size of the gap;
3. c = the constant of proportionality between $\theta$ and $\Phi - \Phi_0$ in the equation $\theta = c(\Phi - \Phi_0)$;
4. h = the maximum height.

A computer program has been used to carry out the calculations, and these values are obtained from the user (see lines six and thirteen of the program which is attached as a computer software Appendix included as part of the specification).

Figure 3B:
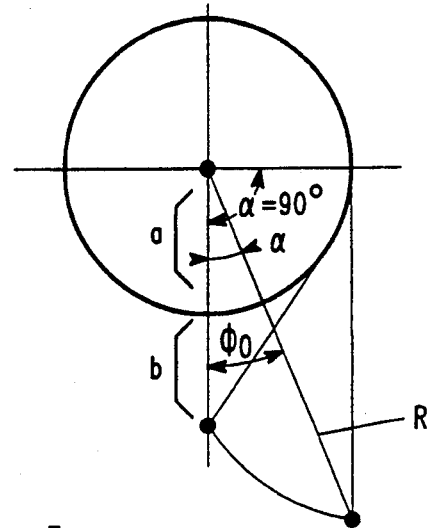
FIG. 3A illustrates a bottom portion of an optical system and FIG. 3B shows the involute portion of the reflecting surface with selected critical design dimensions and angular design parameters associated with the source.
Figure 3A:
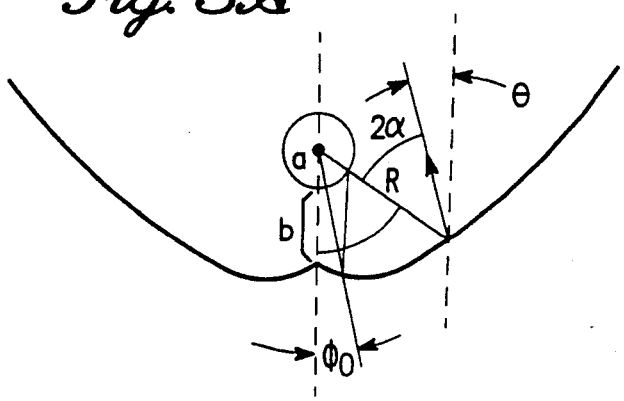

From $\Phi = 0$ to $\phi = \Phi_0$ in FIG. 3B the reflector profile is an involute of a circle with its distance of closest approach equal to b. The parametric equations for this curve are parameterized by the angle $\alpha$ (see FIG. 3A). As can be seen in FIG. 3B, as $\Phi$ varies from 0 to $\Phi_0$, $\alpha$ varies from $\alpha_0$ to ninety degrees. The angle $\alpha_0$ depends on a and b, and is calculated in line fourteen of the computer software program. Between lines fifteen and one hundred and one, fifty points of the involute are calculated in polar coordinates by stepping through these parametric equations. The $(r,\theta)$ points are read to arrays r(i), and theta(i), respectively.

For values of $\Phi$ greater than $\Phi_0$, the profile is the solution to the differential equation:

$$d(lnr)/d\Phi = \tan\{\Phi - \theta + \arcsin(a/r)\}$$

where $\theta$ is a function of $\phi$. This makes the profile $r(\phi)$ a functional of $\theta$. In the sample calculation performed, $\theta$ is taken to be a linear function of $\Phi$ as in step 4. Other functional forms are described in the specification. It is desired to obtain one hundred fifty $(r,\text{theta})$ points in this region. In addition, the profile must be truncated to have the maximum height, h. We do not know the $(r,\text{theta})$ point which corresponds to this height, and thus, we must solve the above equation by increasing phi beyond $\Phi_0$ until the maximum height condition is met. This is carried out using the conventional fourth order Runga-Kutta numerical integration method between lines one hundred two and one hundred and fifteen. The maximum height condition is checked between lines one hundred sixteen and one hundred twenty.

Once the $(r,\text{theta})$ point at the maximum height is known, we can set our step sizes to calculate exactly one hundred fifty $(r,\text{theta})$ points between $\Phi_0$ and the point of maximum height. This is done between lines two hundred one and three hundred using the same numerical integration procedure. Again, the points are read into arrays r(i), theta(i).

In the end, we are left with two arrays: r(i) and theta(i), each with two hundred components specifying two hundred $(r,\text{theta})$ points of the reflector surface. These arrays can then be used for design specifications, and ray trace applications.

In the case of a uniform beam design profile, ($P(\theta) = $ constant), a typical set of parameters is (also see FIG. 1):

$a = 0.055$ in.

$b = 0.100$ in.

$h = 12.36$ in.

$c = 0.05136$ for $\theta(\Phi) = c(\Phi - \Phi_o)$

In the case of an exponential beam profile, generally, $(P(\theta) = Ae^{-B\theta}$ where, $$\theta(\phi) = -C_2 ln(1 - C_1\phi)$$

where A, B, $C_1$, and $C_2$ are constants.
In the case of a Gaussian beam profile:
$[P(A) = A\exp(-B\theta^2)]$;

$$\theta(\phi) = C_1 Erf^{-1}(C_2\phi + \tfrac{1}{2})$$

where $Erf^{-1}$ is the inverse error function given by the expression, $Erf(x) = (1/\sqrt{2\pi}) \int \exp(-x^2/2)dx$, integrated from minus infinity to x;

In the case of a cosine beam profile;

$$P(\theta) = A\cos B\theta;$$

$$\theta = C_1 \sin^{-1}(C_2\phi)$$

where A, B, $C_1$ and $C_2$ are constants.

A ray trace of the uniform beam profile for the optical device of FIG. 1 is shown in a tabular form of output in Table II below:

TABLE II

| ELEVATION | | | | | | | | | | | | | | | |
|---|---|---|---|---|---|---|---|---|---|---|---|---|---|---|---|
| 114 | 202 | 309 | 368 | 422 | 434 | 424 | 608 | 457 | 448 | 400 | 402 | 315 | 229 | 103 |
| 145 | 295 | 398 | 455 | 490 | 576 | 615 | 699 | 559 | 568 | 511 | 478 | 389 | 298 | 126 |
| 153 | 334 | 386 | 465 | 515 | 572 | 552 | 622 | 597 | 571 | 540 | 479 | 396 | 306 | 190 |
| 202 | 352 | 393 | 452 | 502 | 521 | 544 | 616 | 629 | 486 | 520 | 432 | 423 | 352 | 230 |
| 197 | 362 | 409 | 496 | 496 | 514 | 576 | 511 | 549 | 508 | 476 | 432 | 455 | 335 | 201 |
| 241 | 377 | 419 | 438 | 489 | 480 | 557 | 567 | 494 | 474 | 482 | 459 | 421 | 379 | 230 |
| 251 | 364 | 434 | 444 | 487 | 550 | 503 | 558 | 567 | 514 | 500 | 438 | 426 | 358 | 231 |
| 243 | 376 | 441 | 436 | 510 | 526 | 520 | 540 | 540 | 482 | 506 | 429 | 447 | 378 | 234 |
| 233 | 389 | 452 | 430 | 489 | 519 | 541 | 547 | 517 | 500 | 476 | 427 | 442 | 344 | 230 |
| 228 | 369 | 416 | 490 | 522 | 501 | 539 | 546 | 527 | 481 | 499 | 431 | 416 | 347 | 227 |

TABLE II-continued

| | | | | | | | | | | | | | | |
|---|---|---|---|---|---|---|---|---|---|---|---|---|---|---|
| 224 | 359 | 424 | 466 | 493 | 560 | 575 | 553 | 521 | 527 | 526 | 413 | 417 | 320 | 205 |
| 181 | 378 | 392 | 489 | 485 | 504 | 603 | 583 | 563 | 530 | 512 | 422 | 358 | 308 | 194 |
| 150 | 326 | 407 | 435 | 506 | 567 | 602 | 648 | 581 | 535 | 491 | 453 | 414 | 324 | 179 |
| 135 | 265 | 382 | 450 | 541 | 611 | 567 | 654 | 611 | 522 | 568 | 446 | 389 | 300 | 130 |
| 129 | 213 | 295 | 364 | 396 | 404 | 420 | 557 | 469 | 435 | 447 | 351 | 287 | 206 | 146 |

AZIMUTH

APPENDIX - COMPUTER SOFTWARE PROGRAM

```
      program coordinates
      dimension r(1:200), theta(1:200), dzdx(1:200)
   dimension xx(1:200), zz(1:200)
   real l, k1, k2, k3, k4
   parameter (degtorad=3.1415927/180.0)

write(*,*)'Enter radius of cylindrical absorber.'
   read(*,*)a
   write(*,*)'Enter gap size.'
   read(*,*)b
   write(*,*)'Enter constant.'
   read(*,*)c
   write(*,*)'Enter maximum height.'
   read(*,*)h
```

GENERATE 50 POINTS OF AN INVOLUTE
```
   alpha0= acos(a/(a + b))
   do 100 i=1,50,1
      alpha= ((90*degtorad-alpha0)/49.0)*float(i-50)+90*degtorad
      d= (alpha-alpha0)*a + sqrt((a+b)**2 - a**2)
      x= a*sin(alpha) - d*cos(alpha)
      z= -a*cos(alpha) - d*sin(alpha)
      r(i)= sqrt(x**2 + z**2)
      theta(i)= atan(z/x)
      phi= theta(i) + (90.0*degtorad)
   continue
   theta(1)= -90.0*degtorad
```

GENERATE 150 POINTS OF THE WINSTON-TYPE CONCENTRATOR
```
   v= 0.0
   h= 0.001
   phi0= theta(50) + (90.0*degtorad) + 0.001
   phi= phi0
   f= alog(r(50))
   do 200 while(v.eq.0.0)
      phi= phi + h
      k1= h*tan(0.5*((1.0-c)*phi+c*phi0+asin(a/exp(f))))
      k2= h*tan(0.5*((1.0-c)*(phi+0.5*h)+c*phi0+
 &       asin(a/exp(f+0.5*k1))))
      k3= h*tan(0.5*((1.0-c)*(phi+0.5*h)+c*phi0+
 &       asin(a/exp(f+0.5*k2))))
      k4= h*tan(0.5*((1.0-c)*(phi+h)+c*phi0+
 &       asin(a/exp(f+k3))))
      f= f + (k1/6.0) + (k2/3.0) + (k3/3.0) + (k4/6.0)
      rad= exp(f)
      z= rad*sin(phi-(90*degtorad))
      if(z.ge.a) then
        phimax= phi
        write(*,*)'phimax=',phi/degtorad
        v= 1.0
      endif
   continue
```

```
f= alog(r(50))
phi= (-1.0/149.0)*(phimax-phi0)+phi0
h= (phimax phi0)/149.0
do 300 i=1,150,1
    phi= phi + h
    k1= h*tan(0.5*((1.0-c)*phi+c*phi0+asin(a/exp(f))))
    k2= h*tan(0.5*((1.0-c)*(phi+0.5*h)+c*phi0+
&   asin(a/exp(f+0.5*k1))))
    k3= h*tan(0.5*((1.0-c)*(phi+0.5*h)+c*phi0+
&   asin(a/exp(f+0.5*k2))))
    k4= h*tan(0.5*((1.0-c)*(phi+h)+c*phi0+
&   asin(a/exp(f+k3))))
    f= f + (k1/6.0) + (k2/3.0) + (k3/3.0) + (k4/6.0)
    r(i+50)= exp(f)
    theta(i+50)= phi - (90.0*degtorad)
continue stop
    end
```

I claim:

1. A nonimaging illumination optical device for producing a selected intensity output over an angular range $\theta$, comprising:

a source of light having a surface and a characteristic dimension;

a light reflecting surface having an aperture opening and positioned a distance from said light source with said light source subtending an angle at said light reflecting surface and said light reflecting surface disposed at least partially around said light source, said light source disposed opposite the aperature opening of said light reflecting surface and said characteristic dimension of said light source being small relative to at least one of the size of said aperature opening, and the distance from said light source to said light reflecting surface at said aperature opening; and a spatial position of said light reflecting surface for producing said selected intensity output being defined relative to a light ray originating from said light source in terms of radius vector $R_i$ from a point within said light source in conjunction with angle $\Phi_i$ between said radius vector $R_i$ and a direction 180° from direct forward illumination output from said nonimaging illumination optical device and an angle $\theta_i$ between direct forward illumination and the light ray as reflected once from said light reflecting surface with said radius vector $R_i$ defining a profile of said spatial position of said light reflecting surface with said profile varying as a function of said angle $\Phi_i$ in accordance with the expression:

$$R_i = (\text{const.})\exp\{\int \tan[(\phi_i-\theta_i)/2]d\phi_i\}$$

2. The nonimaging illumination optical device as defined in claim 1 wherein said selected intensity output is constant as a function of $\theta_i$ such that the spatial position of said light reflecting surface is defined by said radius vector $R_i$ in accordance with the expression:

$$R_i = R_0 \cos^k(\Phi_i/k)$$

where $k = 2/(1-a)$ $R_0$ = length of vector R in a direction 180° from direct forward illumination and $\theta_i = a\phi_i$ $a$ = a constant value 3. The nonimaging illumination optical device as defined in claim 1 wherein said selected intensity output produces an illumination distribution on a reference surface located at a distance from said nonimaging illumination optical device which is large compared to the aperature opening of said nonimaging illumination optical device.

4. The nonimaging illumination optical device as defined in claim 1 wherein said selected intensity output comprises a substantially exponential behavior as a function of $\theta_i$ such that the spatial position of said light reflecting surface is defined by said radius vector $R_i$ in accordance with the expression:

$$R_i = (\text{const.})\exp\{\int \tan[(\Phi_i-\theta_i)/2]d\Phi_i\}$$

where $\theta_i = -C_2 \ln(1-C_1\phi_i)$ and $C_1$, $C_2$ are constants

5. The nonimaging illumination optical device as defined in claim 1 wherein said selected intensity output comprises a substantially Gaussian behavior as a function of $\theta_i$ such that the spatial position of said light reflecting surface is defined by said radius vector $R_i$ in accordance with the expression:

$$R_i = \exp\{\int \tan[(\Phi_i-\theta_i)/2]d\phi_i\}$$

wherein:

$$\theta_i = C_1 Erf^{-1}(C_2\phi_i)$$

$Erf^{-1}$ is the inverse error function with the integral taken from minus infinity to x and $C_1$ and $C_2$ = constants 6. The nonimaging illumination optical device as defined in claim 1 wherein said selected intensity output is substantially a cosine as a function of $\phi_i$ such that the spatial position of said light reflecting surface is defined by said radius vector $R_i$ in accordance with the expression:

$$R_i = \exp\{\int \tan[\phi_i-\theta_i)/2]d\phi_i\}$$

wherein:

$\theta_i = C_1 \sin^{-1}(C_2 \phi_i)$ $\sin^{-1}$ is the arc sine function $C_1$ and $C_2$ = constants 7. The nonimaging illumination optical device as defined in claim 1 wherein said selected intensity output behaves in accordance with the function $P(\Omega_i)$ wherein $\Omega_i$ is a solid angle and the spatial position of said light reflecting surface is defined by said radius vector $R_i$ in accordance with the expression:

$R_i = \exp\{\int \tan[(\phi_i - \theta_i)/2]d\phi_i$ and $\int P(\Omega_i)d(\cos \theta_i)$ is a linear function of $\cos \phi_i$ 8. The nonimaging illumination optical device as defined in claim 1 where $\theta_i = \theta'_i$ with said angle $\theta'_i$ calculated in accordance with an edge ray method such that:

$\theta'_i = \theta_i - \delta$ where $\delta$ = angle subtended by said light source at said light reflecting surface.

9. The nonimaging illumination optical device as defined in claim 8 wherein said light source comprises a substantially circular shape of radius, a, wherein, $\delta$ = arc sin $(a/R_i)$ $R = \exp\{\int \tan(\frac{1}{2})[(\phi_i - \theta_i) + \arc \sin(a/R_i)]d\phi_i$.

10. The nonimaging illumination optical device as defined in claim 8 wherein said spatial position of said light reflecting surface includes another surface portion involute to said light source.

11. The nonimaging illumination optical source as defined in claim 8 wherein said selected light output has different profiles in two orthogonal planes and said different profiles are determined in said two orthogonal planes in accordance with at least a portion of said light reflecting surface being defined independently in association with each of said two orthogonal planes by said radius vector $R_i$ defined by the expression:

$R_i = \exp\{\int \tan[(\Phi_i - \theta'_i)/2]d\phi_i\}$ wherein the angle $\theta_i$ is calculated in accordance with the edge-ray method such that:

$\theta'_i = \theta_i - \delta$ and said $\delta$ being the angle subtended by said light source at said light reflecting surface.

12. The nonimaging illumination optical device as defined in claim 11 wherein $\theta_i$ has a functional dependence on $\phi_i$ and the functional dependence of $\theta_i$ on $\phi_i$ is optimized to achieve a relatively uniform output over output angle $\theta_i$ in each of said two orthogonal planes.

13. The nonimaging illumination optical device as defined in claim 11 wherein $\theta_i$ has a functional dependence on $\phi_i$ and the functional dependence of $\theta_i$ on $\phi_i$ in each of said two orthogonal planes is optimized to achieve a preselected output over the angle $\theta_i$ including at least one of substantially exponential, Gaussian and cosine.

14. The nonimaging illumination optical device as defined in claim 11 wherein said at least a portion of said light reflecting surface is involute to said light source.

15. A nonimaging illumination optical device for selectively outputting light having a preselected intensity output over a particular angular range $\theta_i$, comprising:

a source of light having a surface and negligible dimensions along at least two dimensions;

a light reflecting surface having an aperture opening and positioned at least partially around said source of light and said light source disposed opposite the aperture opening of said light reflecting surface; and a spatial position of said light reflecting surface being defined relative to said source of light in terms of a radius vector $R_i$ from a point within said light source in conjunction with an angle $\phi_i$ between said radius vector $R_i$ and a direction 180° from direct forward illumination output from said nonimaging illumination optical device and an angle $\theta_i$ between direct forward illumination and the light ray as reflected once from said light reflecting surface with said radius vector $R_i$ varying as a function of said angle $\theta_i$ in accordance with the expression:

$R_i = (\text{const.}) \exp\{\int \tan[(\phi_1 - \theta_i)/2]d\phi\}$

16. The nonimaging illumination optical device as defined in claim 15 wherein said preselected intensity output comprises a substantially constant intensity over said particular angular range.

17. A nonimaging illumination optical device for generating a selected intensity output for electromagnetic radiation over an angular range $\theta_i$, comprising:

a finite, small source of electromagnetic radiation having a surface and a characteristic source dimension;

an electromagnetic radiation reflecting surface having an opening positioned at least partially around said finite, small source of electromagnetic radiation and said finite, small source of electromagnetic radiation disposed opposite the opening of said electromagnetic radiation reflecting surface, said electromagnetic radiation reflecting surface having characteristic surface contour parameters with said characteristic source dimension of said source of electromagnetic radiation being small relative to a dimensional parameter of said nonimaging illumination optical device; and a spatial position of said electromagnetic radiation reflecting surface being defined relative to an electromagnetic energy ray originating from said source of electromagnetic radiation in terms of an angle $\theta_i$ between direct forward illumination and said electromagnetic energy ray as reflected once from said reflecting surface with said angle $\theta_i$ a function of at least one of said characteristic surface contour parameters.

18. The nonimaging illumination optical device as defined in claim 17 wherein said characteristic surface contour parameter includes at least one of a radius vector $R_i$ from a point within said source of electromagnetic radiation to said electromagnetic radiation reflecting surface, an angle $\Phi_i$ between said radius vector $R_i$ and a direction 180° from direct forward illumination output from said nonimaging illumination optical device and a measure of a distance along said electromagnetic radiation reflecting surface.

19. The nonimaging illumination optical device as defined in claim 17 wherein $\theta_i$ is a solid angle with said electromagnetic radiation reflecting surface extending over three dimensions.

20. A nonimaging electromagnetic radiation collection device for collecting electromagnetic radiation with uniform efficiency over an angular range $\theta_i$, comprising:
  a collector having a surface for receiving said electromagnetic radiation;
  a light reflecting surface having an opening and positioned at least partially around said collector and disposed opposite the opening of said light reflecting surface; and
  a spatial position of said light reflecting surface being defined relative to said collector for receiving an electromagnetic energy ray in terms of a radius vector $R_i$ from the surface of said collector in conjunction with an angle $\phi_i$ between said radius vector $R_i$ and a direction 180° from direct forward illumination output from said nonimaging electromagnetic radiation collection device and an angle $\theta_i$ between direct forward illumination and said electromagnetic energy ray as reflected once from said light reflecting surface to said collector with said radius vector $R_i$ varying as a function of said angle $\phi_i$ in accordance with the expression:

$$R_i = (\text{const.}) \exp\{\int \tan[(\phi_i - \theta'_i)/2] d\phi\}$$

$\theta_i' = \theta_i - \delta$, $\delta$ = angle subtended by source at reflector 21. The nonimaging electromagnetic radiation collection device as defined in claim 20 wherein said collector comprises an energy transducer wherein $\theta_i$ further has a functional dependence on $\phi_i$ and is optimized to achieve a relatively uniform input over the angle $\theta_i$.

22. The nonimaging electromagnetic radiation collection device as defined in claim 21 wherein said spatial position of said light reflecting surface includes another portion involute to said collector.

23. The nonimaging electromagnetic collection device as defined in claim 20 wherein said collector comprises an energy transducer and further said $\theta_i$ has a functional dependence on $\phi_i$ and the functional dependence of $\theta_i$ and $\phi_i$ is optimized to achieve a preselected input having at least one of a substantially exponential, Gaussian and cosine distribution.

24. The nonimaging electromagnetic collection device as defined in claim 21 wherein $\theta_i$ has a functional dependence of $\phi_i$ and said collector comprises an energy transducer wherein the functional dependence of $\theta_i$ on $\phi_i$ is optimized to achieve a preselected input having at least one of a substantially exponential, Gaussian and cosine distribution.

25. A nonimaging illumination optical device for producing substantially uniform intensity output as a function of solid angle $\Omega$, comprising:
  a source of light having a surface;
  a light reflecting surface having an opening and positioned at least partially around said source of light source and said source of light source disposed opposite the opening of said light reflecting surface; and
  a spatial position of said light reflecting surface for producing said substantially uniform intensity output being defined relative to a light ray originating from said source of light in terms of radius vector $R_i$ from a point within said source of light in conjunction with angle $\phi_i$ between said radius vector $R_i$ and a direction 180° from direct forward illumination output from said nonimaging optical illumination device and an angle $\theta_i$ between direct forward illumination and the light ray as reflected once from said light reflecting surface with said radius vector $R_i$ defining a profile of said spatial position of said light reflecting surface varying as a function of said angle $\phi_i$ in accordance with the expression:

$$R_i = \exp\{\int \tan[(\phi_i - \theta_i)/2] d\phi_i\}$$

where $\cos\theta_i$ is a linear function of $\cos\phi_i$.

* * * * *